United States Patent
Watanabe

(10) Patent No.: US 10,354,367 B2
(45) Date of Patent: Jul. 16, 2019

(54) IMAGE PROCESSING APPARATUS, IMAGE PICKUP APPARATUS, IMAGE PROCESSING METHOD, IMAGE PROCESSING PROGRAM, AND STORAGE MEDIUM

(71) Applicant: CANON KABUSHIKI KAISHA, Tokyo (JP)

(72) Inventor: Takeshi Watanabe, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 93 days.

(21) Appl. No.: 15/540,452

(22) PCT Filed: Jul. 7, 2016

(86) PCT No.: PCT/JP2016/003228
§ 371 (c)(1),
(2) Date: Jun. 28, 2017

(87) PCT Pub. No.: WO2017/017909
PCT Pub. Date: Feb. 2, 2017

(65) Prior Publication Data
US 2017/0358058 A1     Dec. 14, 2017

(30) Foreign Application Priority Data

Jul. 27, 2015   (JP) ................................ 2015-147373

(51) Int. Cl.
*G06K 9/00*     (2006.01)
*G06T 5/00*     (2006.01)
(Continued)

(52) U.S. Cl.
CPC ................ *G06T 5/002* (2013.01); *G06T 5/20* (2013.01); *G06T 7/11* (2017.01); *H04N 1/409* (2013.01);
(Continued)

(58) Field of Classification Search
CPC ....... G01B 11/254; G06T 7/586; B42D 25/29; B42D 25/333; G06F 21/602
(Continued)

(56) References Cited

U.S. PATENT DOCUMENTS 5,777,441 A * 7/1998 Yoshida ............... H04N 3/2335
                                                              315/10
6,100,929 A * 8/2000 Ikeda ..................... G02B 27/46
                                                              348/219.1
(Continued)

FOREIGN PATENT DOCUMENTS

| JP | 2006262081 A | 9/2006 |
| JP | 2007300203 A | 11/2007 |
| JP | 2014053883 A | 3/2014 |

OTHER PUBLICATIONS

Omer et al. "Color Lines: Image Specific Color Representation." Computer Vision and Pattern Recognition, 2004. Proceedings of the 2004 IEEE Computer Society Conference on Jun. 27-Jul. 2, 2004: 1-8. Cited in Specification.
(Continued)

*Primary Examiner* — Charlotte M Baker
(74) *Attorney, Agent, or Firm* — Rossi, Kimms & McDowell LLP

(57) ABSTRACT

An image processing apparatus includes an estimator (804*b*) which estimates a moire component included in an image based on optical characteristic information, a determiner (804*c*) which determines a correction amount based on the estimated moire component, and a corrector (804*d*) which corrects the image so as to reduce the moire component included in the image based on the correction amount.

17 Claims, 8 Drawing Sheets

(51) Int. Cl.

| | |
|---|---|
| *H04N 1/409* | (2006.01) |
| *H04N 9/07* | (2006.01) |
| *G06T 7/11* | (2017.01) |
| *G06T 5/20* | (2006.01) |
| *H04N 9/64* | (2006.01) |
| *H04N 5/217* | (2011.01) |
| *H04N 5/357* | (2011.01) |
| *H04N 9/04* | (2006.01) |

(52) U.S. Cl.
CPC .......... *H04N 5/217* (2013.01); *H04N 5/3572* (2013.01); *H04N 9/045* (2013.01); *H04N 9/07* (2013.01); *H04N 9/646* (2013.01); *G06T 2207/10024* (2013.01); *G06T 2207/20104* (2013.01)

(58) Field of Classification Search
USPC ............... 382/167, 154, 118, 181, 190, 103; 315/371, 10; 348/189, 806, E3.045, 262, 348/219.1, 236, 273, E5.028, E9.01, 348/231.2; 359/629, 627; 356/301; 250/208.1; 385/1, 4
See application file for complete search history.

(56) References Cited

U.S. PATENT DOCUMENTS

| | | | | |
|---|---|---|---|---|
| 7,379,247 | B2* | 5/2008 | Goto | G02B 7/10 359/627 |
| 7,623,701 | B2* | 11/2009 | Kim | G06T 7/586 382/154 |
| 8,064,656 | B2* | 11/2011 | Fukushima | G06F 17/30259 382/118 |
| 2009/0263018 | A1 | 10/2009 | Murakami et al. | |
| 2012/0050583 | A1 | 3/2012 | Watanabe | |
| 2015/0146046 | A1 | 5/2015 | Ogasahara et al. | |

OTHER PUBLICATIONS

Ono et al. "A Convex Regularizer for Reducing Color Artifact in Color Image Recovery." Computer Vision and Pattern Recognition (CVPR) 2013. IEEE Conference on Jun. 23-28, 2013: 1775-1781. Cited in Specification.

International Search Report issued in Intl. Appln. No. PCT/JP2016/003228 dated Sep. 20, 2016.

Written Opinion issued in Intl. Appln. No. PCT/JP2016/003228 dated Sep. 20, 2016.

* cited by examiner

ESTIMATION REGION OF MOIRE
GENERATION AMOUNT

IMAGE PROCESSING APPARATUS, IMAGE PICKUP APPARATUS, IMAGE PROCESSING METHOD, IMAGE PROCESSING PROGRAM, AND STORAGE MEDIUM

TECHNICAL FIELD

The present invention relates to an image processing apparatus that corrects a moire component included in an image.

BACKGROUND ART

For an object captured via an image pickup optical system, light emitted from one point cannot be converged to another point and has a minute spread due to an influence of a diffraction, an aberration, or the like that occurs in the image pickup optical system. Such a minutely-spread distribution is referred to as a PSF (point spread function). Due to the influence of the image pickup optical system, the captured image is formed with the PSF convolved with the image, and accordingly, the image is blurred and its resolution is deteriorated.

When an object image (optical image) is acquired as a digital image, the optical image is discretized with pixel pitch intervals by an image pickup element. When a frequency response of the optical image exceeds Nyquist frequency of the image pickup element, aliasing occurs. Due to the generation of the aliasing, a moire (periodic pattern) occurs in the digital image. In the image pickup apparatus such as a digital camera, typically, the generation of the moire is not preferable, and in particular a color moire is also called a false color. As a method of reducing the generation of the moire, a method of inserting an optical low-pass filter to attenuate the frequency response near the Nyquist frequency of the image pickup element is known.

On the other hand, PTL 1 discloses an image pickup apparatus that captures a plurality of images while driving optical lenses (image pickup optical system) minutely to acquire an image in which any moire is not generated. PTL 2 discloses an image processing method that stores a frequency at which the moire occurs based on a relationship between a dot density at the time of printing and a surface density of an image itself and that specifies a region of the image where the moire occurs based on frequency characteristics of the image. NPL1 discloses linearity between color components of a locus region in an image, and it discloses a method of reducing a color noise by improving the linearity between the color components when the color noise occurs. NPL2 discloses a method of reducing a phenomenon where the linearity between the color components is collapsed like the color noise.

CITATION LIST

Patent Literature

[PTL 1] Japanese Patent Laid-open No. 2014-53883
[PTL 2] Japanese Patent Laid-open No. 2006-262081

Non Patent Literature

[NPL 1] Color Lines: Image Specific Color Representation.
[NPL 2] A Convex Regularizer for Reducing Color Artifact in Color Image Recovery

SUMMARY OF INVENTION

Technical Problem

However, in the image pickup apparatus disclosed in PTL 1, it is necessary to capture a plurality of images while the image pickup optical system is minutely driven, and accordingly the configuration of the image pickup apparatus is complicated.

The image processing method disclosed in PTL 2 is limited to image processing for printing an image. Since NPL 1 and NPL 2 do not describe a correction amount to improve the linearity between the color components, the methods disclosed in NPL 1 and NPL 2 cannot correct a moire component included in an image effectively.

The present invention provides an image processing apparatus, an image pickup apparatus, an image processing method, an image processing program, and a storage medium which are capable of effectively correcting a moire component included in an image.

Solution to Problem

An image processing apparatus as one aspect of the present invention includes an estimator configured to estimate a moire component included in an image based on optical characteristic information, a determiner configured to determine a correction amount based on the estimated moire component, and a corrector configured to correct the image so as to reduce the moire component included in the image based on the correction amount.

An image pickup apparatus as another aspect of the present invention includes an image pickup element configured to photoelectrically convert an optical image formed via an image pickup optical system to output an image signal, an estimator configured to estimate, based on optical characteristic information, a moire component included in an image generated from the image signal, a determiner configured to determine a correction amount based on the estimated moire component, and a corrector configured to correct the image so as to reduce the moire component included in the image based on the correction amount.

An image processing method as another aspect of the present invention includes the steps of estimating a moire component included in an image based on optical characteristic information, determining a correction amount based on the estimated moire component, and correcting the image so as to reduce the moire component included in the image based on the correction amount.

An image processing program as another aspect of the present invention causes a computer to execute a process including the steps of estimating a moire component included in an image based on optical characteristic information, determining a correction amount based on the estimated moire component, and correcting the image so as to reduce the moire component included in the image based on the correction amount.

A storage medium as another aspect of the present invention stores the image processing program.

Further features of the present invention will become apparent from the following description of exemplary embodiments with reference to the attached drawings.

Advantageous Effects of Invention

According to the present invention, an image processing apparatus, an image pickup apparatus, an image processing method, an image processing program, and a storage medium which are capable of effectively correcting a moire component included in an image can be provided.

DESCRIPTION OF EMBODIMENTS

Exemplary embodiments of the present invention will be described below with reference to the accompanied drawings.

Embodiment 1

Figure 1:
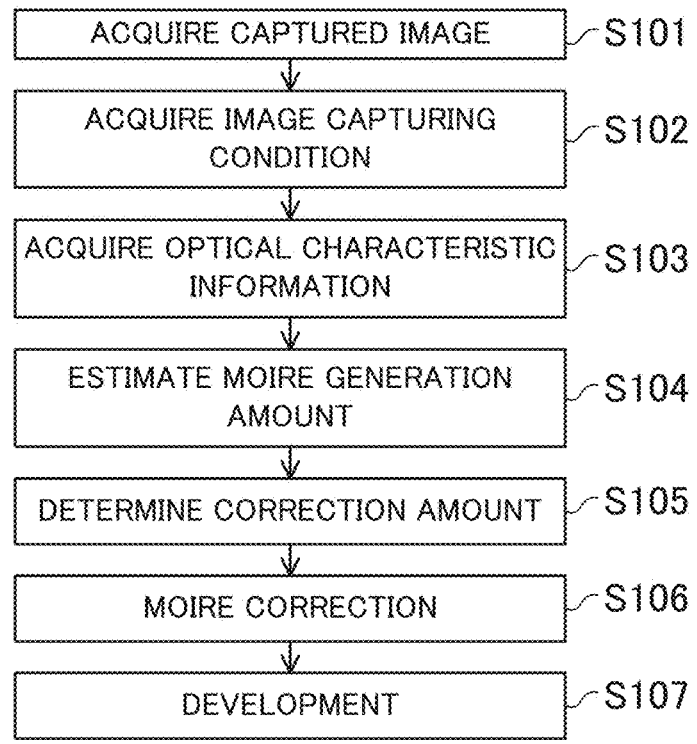
FIG. 1 is a flowchart of an image processing method in Embodiment 1.

First of all, referring to FIG. 1, an image processing method in Embodiment 1 of the present invention will be described. FIG. 1 is a flowchart of the image processing method in this embodiment. Each step in FIG. 1 is performed by each unit of an image processing apparatus.

First, at step S101, the image processing apparatus (acquirer) of this embodiment acquires an image (captured image) to be subject to image restoration processing. Subsequently, at step S102, the image processing apparatus (acquirer) acquires an image capturing condition (image capturing condition information) to start moire correction processing on the image acquired at step S101. In this embodiment, the image processing apparatus may acquire the image capturing condition from for example Exif information associated with the image acquired at step S101 or acquire the image capturing condition directly. In this embodiment, the image capturing condition includes information relating to a lens identification number (lens ID) to specify a lens used for photography, a focal length for the photography, and an F number, an object distance, presence or absence of an optical low-pass filter or its characteristic, and a Nyquist frequency of an image pickup element.

Subsequently, at step S103, the image processing apparatus (acquirer) acquires optical characteristic information based on the image capturing condition acquired at step S102. In other words, the image processing apparatus acquires (specifies) the optical characteristic information corresponding to the image capturing condition that is a combination of the parameters described above. In this embodiment, the optical characteristic information is an optical transfer function (OTF) or a modulation transfer function (MTF) as an absolute value of the OTF.

The image processing apparatus of this embodiment performs image processing while dividing a whole of an image into S regions (S division) in a vertical direction and into T regions (T division) in a horizontal direction. Hereinafter, a block (region in the image) whose number is s in the vertical direction and t in the horizontal direction in the image is represented as (s,t), and the (s,t)-th block will be described.

In an incoherent imaging system, expression (1) below is satisfied, where in a real space (x,y), f(x,y) is an object (image) to be captured, h(x,y) is a PSF (point spread function), and g(x,y) is an optical image.

$$g(x,y)=\iint f(X,Y)*h(x-X,y-Y)dXdY \quad (1)$$

When the Fourier transform is performed for expression (1) to convert the real space (x,y) to a frequency space (u,v), expression (1) can be represented as expression (2) below.

$$G(u,v)=F(u,v)*H(u,v) \quad (2)$$

In expression (2), F(u,v), G(u,v), and H(u,v) are results of the Fourier transform of f(x,y), g(x,y), and h(x,y), respectively.

The OTF corresponds to H(u,v) in expression (2). The MTF corresponds to an absolute value |H(u,v)| of H(u,v). The OTF may be determined considering an optical low-pass filter, frequency characteristics of a pixel shape, or the like. The OTF greatly varies depending on an image height and a color (wavelength). Accordingly, in this embodiment, the OTF is represented as H(u,v,s,t) considering the block (s,t), that is, image height, in the image in addition to the frequency space (u,v). In this embodiment, it is preferred that a variable relating to the color (wavelength) is added, but this description is omitted.

Subsequently, at step S104, the image processing apparatus (estimator) estimates a moire generation amount based on the optical characteristic information acquired at step S103, i.e., the OTF represented as H(u,v,s,t). Then, at step S105, the image processing apparatus (determiner) determines a correction amount based on the moire generation amount estimated at step S104. H(u,v,s,t) is a characteristic which is independent of an object. While a real image (optical image) corresponds to G(u,v,s,t) as represented by expression (2), the moire generation amount can be estimated based on H(u,v,s,t). In other words, since a characteristic multiplied by H(u,v,s,t) as the OTF is acquired regardless of the characteristic of a real object spectrum F(u,v,s,t), there is a possibility that the moire occurs if a response on the Nyquist frequency of H(u,v,s,t) is received. Accordingly, the image processing apparatus can estimate the moire generation amount based on the Nyquist frequency (for example a maximum value, a sum total, an average of the Nyquist frequency) of |H(u,v,s,t)|.

Figure 2:
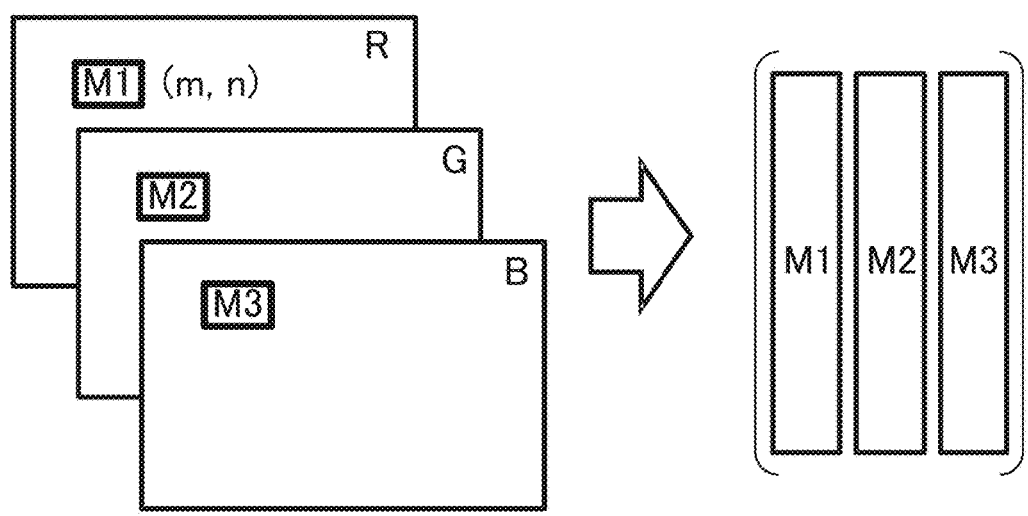
FIG. 2 is a diagram of illustrating an example of a color line matrix in Embodiment 1.

As illustrated in FIG. 2, the image processing apparatus of this embodiment generates a matrix M=(M1,M2,M3) as a color line matrix which includes column vectors of RGB components in an arbitrary region in an image. FIG. 2 is a diagram of illustrating an example of the color line matrix. Symbols M1, M2, and M3 denote row vectors with m rows, and m is equal to the number of pixels in the arbitrary region in the image. An i-th row corresponds to an i-th pixel. The row vectors M1, M2, and M3 correspond to the RGB components in the image, respectively.

In this embodiment, the image processing apparatus performs a singular value decomposition for the matrix M.

According to the singular value decomposition, M=UΣV* is obtained. Symbol V* is an adjoint matrix of V. In the case, with respect to singular values σ1, σ2, and σ3 of the singular matrix Σ, β1=max{(σ1−γ1),0}, β2=max{(σ2−γ2),0}, and β3=max{(σ3−γ3),0} are satisfied, respectively. Symbols γ1, γ2, and γ3 are correction values, and details thereof will be described below. Symbol max{A,B} means a larger value of A and B. Hereinafter, a case where al σ1≥σ2≥σ3 is satisfied, i.e., a case where a maximum singular value is al, will be described.

The linearity of vectors of M1, M2, and M3 is improved with increasing a ratio of the maximum singular value σ1 and each of the singular values σ2 and σ3. In particular, when a color moire occurs, this ratio is decreased. Accordingly, by replacing σ1, σ2, and σ3 with β1, β2, and β3 described above, this ratio can be improved to improve the linearity of M1, M2, and M3.

In this embodiment, the correction amounts γ1, γ2, and γ3 are defined as γ1=w1*λ1, γ2=w2*λ2, and γ3=w3*λ3, respectively. Symbols λ1, λ2, and λ3 on the right side are estimated values of the moire generation amount (i.e., estimated moire component), and they are calculated based on H(u,v,s,t). Symbols w1, w2, and w3 on the right side are reference weights that are used as weights (weight coefficients) relating to the respective singular values. For example, the weight w1 relating to the maximum singular value σ1 may be set to be small compared to each of the weights w2 and w3 relating to the singular values σ2 and σ3 like (w1,w2,w3)=(0.01,1,1) or (w1,w2,w3)=(0.1,1,1). This means that the correction value relating to the maximum singular value σ1 is decreased and that the correction values for the two singular values σ2 and σ3 are increased.

Hereinafter, an example of the method of determining (calculating) the weight w1 will be described. First, with respect to H(u,v,s,t), u=uN and v=vN are set as Nyquist frequencies in the frequency space (u,v). The Nyquist frequency is a parameter that is determined depending on the image pickup element being used. Then, α1, α2, α3, and α4 are defined as a maximum value on a v axis for u=uN, a maximum value on the v axis for u=−uN, a maximum value on a u axis for v=vN, and a maximum value on the u axis for v=−vN, respectively. In other words, α1=max{|H(uN,v,s,t)|}, α2=max{ |H(−uN,v,s,t)|}, α3=max{|H(u,vN,s,t)|}, and α4=max{⊕H(u,−vN,s,t)|} are satisfied. Symbol max{ A} means a maximum value of A.

In this embodiment, w1=W*(α1+α2+α3+α4)/4 is satisfied. Symbol W is a maximum correction amount of a system. Accordingly, W can be previously calculated by measuring a CZP chart or the like in reality for each image pickup apparatus (camera) to be used. In this embodiment, it is preferred that W is around 10 to 100. While the method of calculating the weight w1 is described as a representative in this embodiment, the weights w2 and w3 can also be calculated similarly. When a user wishes to change a strength of the moire correction processing, each value can be changed with reference to the determined weights w1, w2, and w3.

Subsequently, at step S106, the image processing apparatus (correction unit) corrects the image (i.e., performs the moire correction processing) so as to reduce the moire component included in the captured image (image) acquired at step S101 based on the correction amount determined at step S105. Then, at step S107, the image processing apparatus develops the image on which the moire correction processing has been performed.

Figures 3A, 3B:
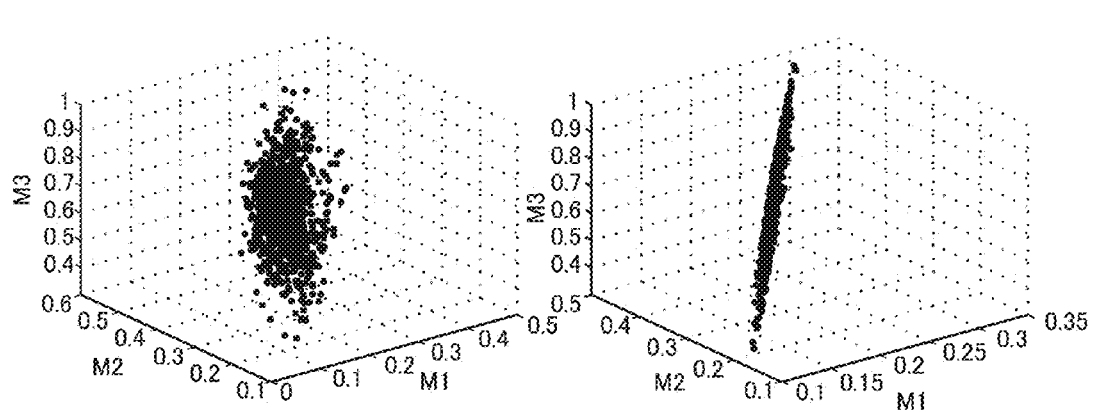
FIG. 3A is a diagram of illustrating linearity of each column in the color line matrix before moire correction processing is performed in Embodiment 1.
FIG. 3B is a diagram of illustrating linearity of each column in the color line matrix after the moire correction processing is performed in Embodiment 1.

FIGS. 3A and 3B are diagrams of illustrating linearity of each column in a color line matrix before the moire correction processing is performed and after the moire correction processing is performed, respectively. FIG. 3A illustrates a three-dimensional diagram with the color line matrix as axes with respect to an image where a color moire occurs before the moire correction processing is performed. FIG. 3B illustrates a three-dimensional diagram with the color line matrix as axes after the moire correction processing is performed. Comparing FIG. 3A with FIG. 3B, it is understood that the ratio of the maximum singular value is corrected to be increased and the linearity for each color line matrix is improved. Thus, the image where the moire component (especially, color moire) has been reduced can be acquired.

In this embodiment, the moire generation amount is estimated based on the optical characteristic information of the Nyquist frequency, but this embodiment is not limited thereto. For example, a predetermined width with reference to the Nyquist frequency may be provided such that an estimation region of the moire generation amount is within a range of uN/2≤u≤uN and vN/2≤v≤vN.

Figure 4A:
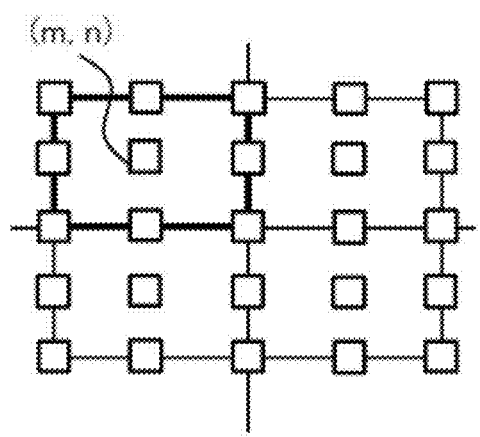
FIG. 4A is a diagram of illustrating an estimation region of a moire generation amount in Embodiment 1.
Figure 4B:
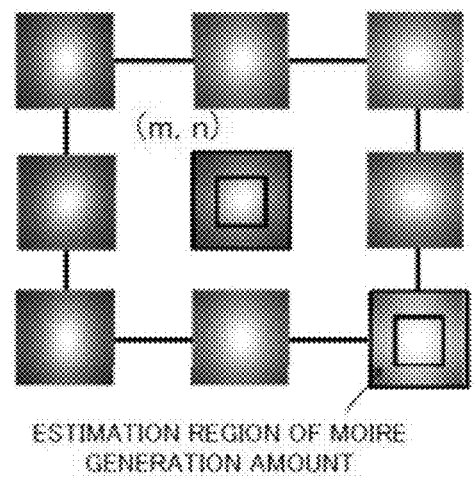
FIG. 4B is a diagram of illustrating the estimation region of the moire generation amount in Embodiment 1.

FIGS. 4A and 4B are diagrams of illustrating the estimation region of the moire generation amount for each image height. FIG. 4A illustrates an image height dividing point (m,n) for each region (image height) in an image, and FIG. 4B illustrates a corresponding optical characteristic with respect to a region of the second quadrant in the image of FIG. 4A. In this embodiment, as illustrated in FIG. 4B, a region between two black frames at an outside and an inside is the estimation region of the moire generation amount. The image processing apparatus estimates the moire generation amount for each image height dividing point (m,n). Then, the image processing apparatus performs the moire correction processing for each region corresponding to the image height dividing point (m,n) by using the estimated moire generation amount.

Figure 5A:
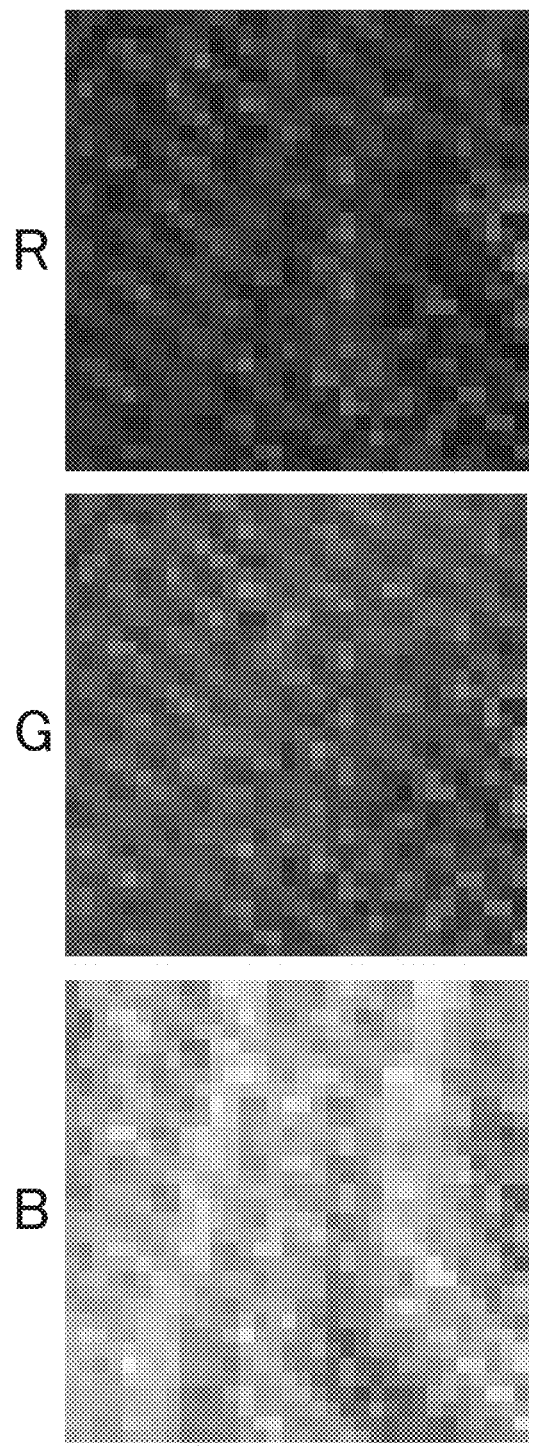
FIG. 5A is an example of an image before the moire correction processing is performed in Embodiment 1.
Figure 5B:
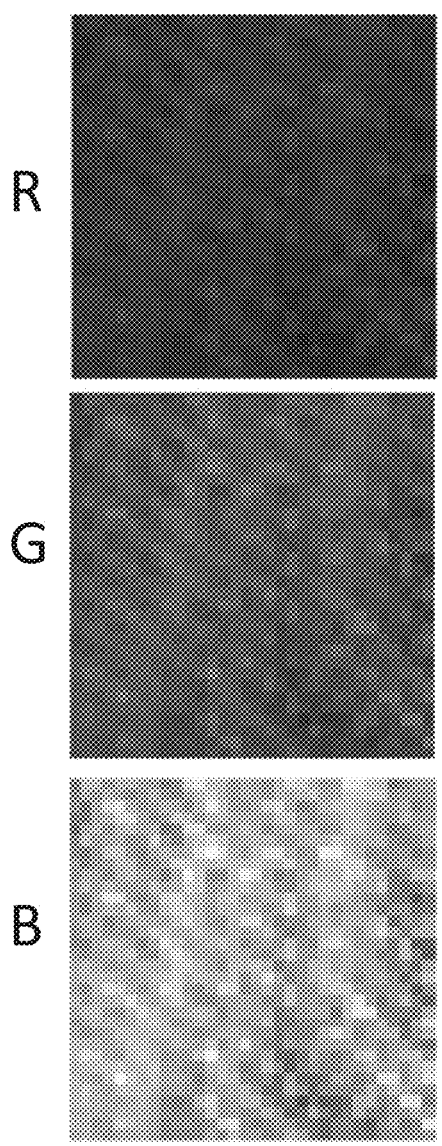
FIG. 5B is an example of an image after the moire correction processing is performed in Embodiment 1.

FIGS. 5A and 5B are an example of images before and after the moire correction processing is performed in this embodiment. FIG. 5A illustrates the image before the moire correction processing is performed and FIG. 5B illustrates the image after the moire correction processing is performed for each of RGB components. As can be seen in FIGS. 5A and 5B, the moire component included in the image can be effectively corrected by the moire correction processing in this embodiment.

Embodiment 2

Figure 6:
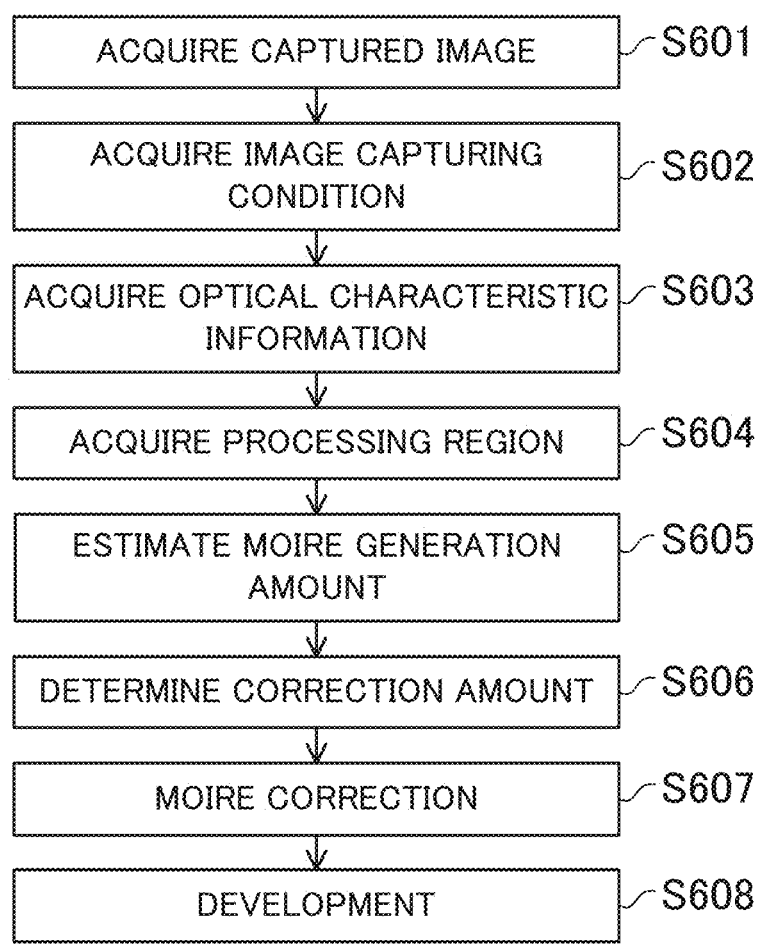
FIG. 6 is a flowchart of an image processing method in Embodiment 2.

Next, referring to FIG. 6, an image processing method in Embodiment 2 of the present invention will be described. FIG. 6 is a flowchart of the image processing method in this embodiment. Each step in FIG. 6 is performed by each unit of the image processing apparatus. This embodiment describes a method of performing moire correction processing on a region specified by a user.

The image processing method of this embodiment is different from the image processing method of Embodiment 1 described referring to FIG. 1 in that the image processing method of this embodiment includes a step (step S604 in FIG. 6) of acquiring the region (processing region) specified by the user. Other steps (steps S601 to S603, and S605 to S608) in this embodiment are the same as steps S101 to S107 in FIG. 1, and accordingly descriptions thereof are omitted.

First, at steps S601, S602, and S603, the image processing apparatus acquires a captured image, an image capturing condition, and optical characteristic information, respectively. Subsequently, at step S604, the image processing apparatus acquires a region (processing region) of the image (captured image) acquired at step S601 that is subject to perform moire correction processing specified by a user. Then, at step S605, the image processing apparatus estimates a moire generation amount relating to the processing region acquired at step S604 based on the optical characteristic information acquired at step S603. In this embodiment, when the image processing apparatus cannot acquire the optical characteristic information relating to the processing region (i.e., optical characteristic information corresponding to the processing region specified by the user) at step S603, it acquires optical characteristic information relating to a region near the processing region. Preferably, in this case, the image processing apparatus acquires optical characteristic information relating to a region corresponding to an image height which is closest to the processing region. Alternatively, the image processing apparatus may interpolate and generate the optical characteristic information relating to the processing region by using optical characteristic information corresponding to the region (image height) near the processing region.

Then, at step S604, the image processing apparatus specifies the block (s,t) of the image corresponding to the region (processing region) specified by the user. In this embodiment, when for example S and T are equal to 20 and 30, respectively (S=20 and T=30), s and t are set to be 4 and 10, respectively (s=4 and t=10). When the optical characteristic information corresponding to the processing region does not exist, the image processing apparatus can calculate it by using optical characteristic information relating to the region near the processing region like s=4, 5, and t=10, 11.

Subsequently, at step S605, the image processing apparatus estimates a moire generation amount for example based on H(u,v,4,10) as optical characteristic information. Then, at step S606, the image processing apparatus determines a correction amount based on the moire generation amount estimated at step S605. In this embodiment, for example, the image processing apparatus determines the moire generation amount based on a maximum value, a sum total, an average of the Nyquist frequency of |H(u,v,4,10)|. Similarly to Embodiment 1, with respect to H(u,v,4,10), u=uN and v=vN are set as Nyquist frequencies in the frequency space (u,v). Furthermore, similarly to Embodiment 1, $\alpha 1 = \max\{|H(uN,v,4,10)|\}$, $\alpha 2 = \max\{|H(-uN,v,4,10)|\}$, $\alpha 3 = \max\{|H(u,vN,4,10)|\}$, and $\alpha 4 = \max\{|H(u,-vN,4,10)|\}$ are satisfied.

Subsequently, at step S607, the image processing apparatus corrects (i.e., performs the moire correction) included in the captured image (image) acquired at step S601 based on the correction amount determined at step S606. Then, at step S608, the image processing apparatus develops the image on which the moire correction processing has been performed.

Embodiment 3

Figure 7:
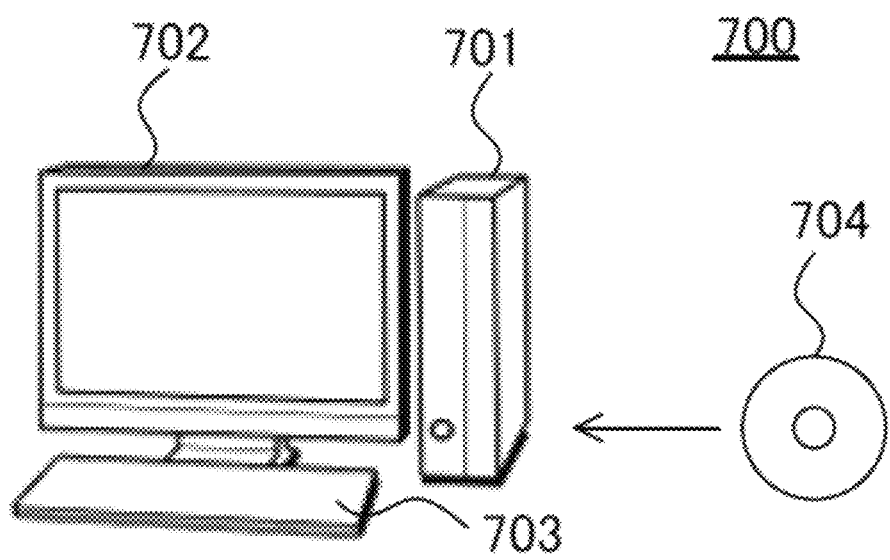
FIG. 7 is a configuration diagram of an image processing system in Embodiment 3.

Next, referring to FIG. 7, an image processing system (image processing apparatus) in Embodiment 3 of the present invention will be described. FIG. 7 is a configuration diagram of an image processing system 700 in this embodiment. The image processing system 700 includes an image processing apparatus 701 (hardware as an information processing apparatus), a display apparatus 702 (monitor), and an input device 703 (input unit such as a keyboard). This embodiment will describe a case in which the image processing method of Embodiment 1 or 2 operates on the image processing system 700 (software in a personal computer).

First, in order to cause the image processing apparatus 701 to operate the image processing method of Embodiment 1 or 2, the software (image processing program) which executes the image processing method is installed in the image processing apparatus 701 (personal computer). The software can be installed from a medium 704 (storage medium) such as a CD-ROM and a DVD-ROM. Alternatively, the software may be installed through download via a network (internet). The image processing apparatus 701 stores a plurality of optical transfer functions (optical transfer function data) of the image pickup optical system. The plurality of optical transfer functions stored in the image processing apparatus 701 are for example all the optical transfer functions for each of various image capturing conditions (image capturing condition information) of the optical system. The optical transfer functions are also downloaded via the medium 704 or the network to be stored in the image processing apparatus 701. In this embodiment, software (image processing program), and data such as optical transfer function information and image capturing condition information are stored in a storage such as a hard disk and a memory in the image processing apparatus 701. The image processing apparatus 701 can be configured to acquire at least part of data from an external server via the network.

The image processing apparatus 701 runs the installed software to perform the moire correction processing on the captured image. On the software, it is possible to perform various settings (settings of parameters) for example to perform the moire correction processing only in a predetermined region (predetermined target region) in the image. It is preferred that a user can change these parameters while confirming the image on the display apparatus 702 after the restoration processing is performed.

Embodiment 4

Figure 8:
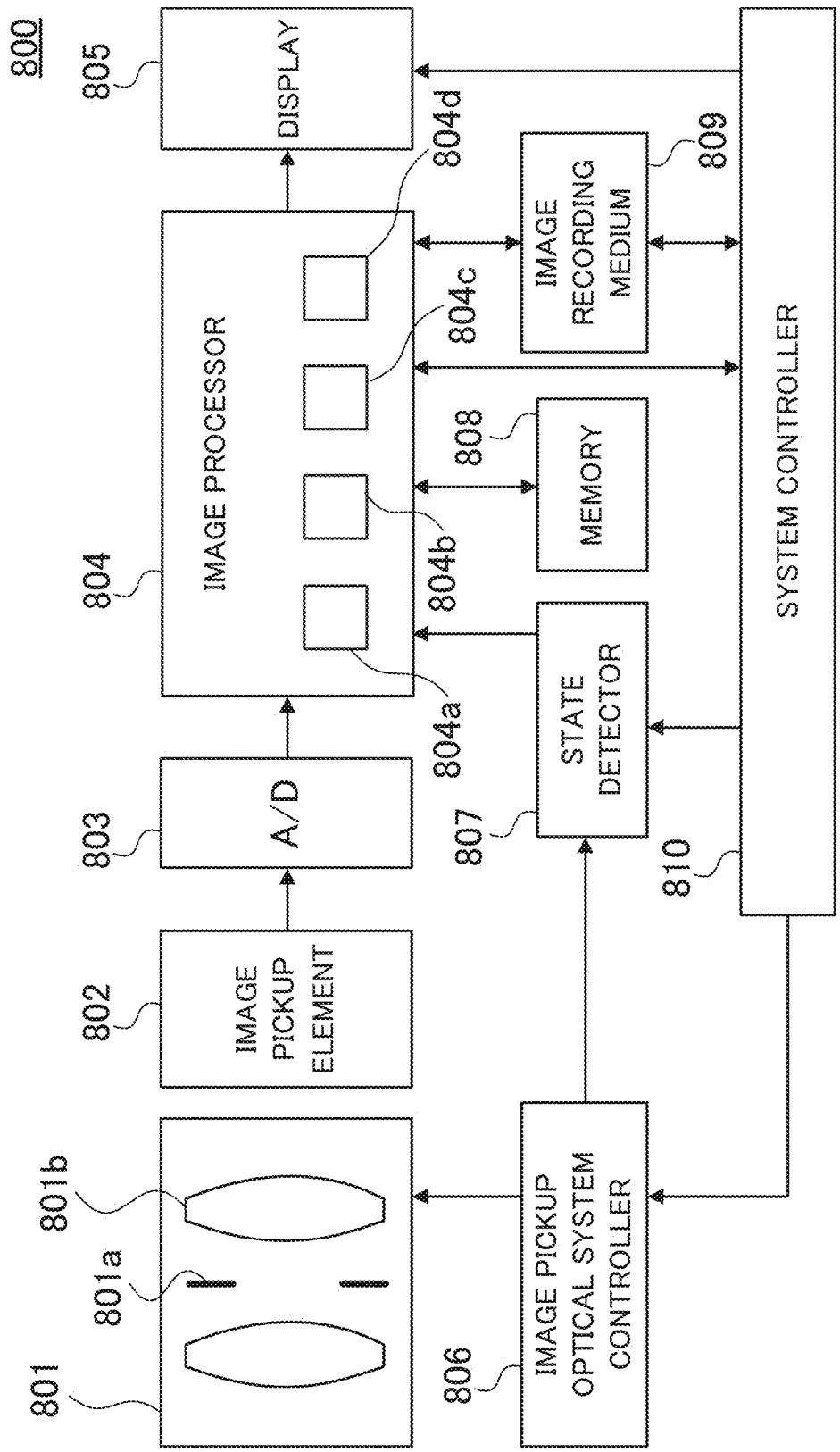
FIG. 8 is a block diagram of an image pickup apparatus in Embodiment 4.

Next, referring to FIG. 8, a basic configuration of an image pickup apparatus in Embodiment 4 of the present invention will be described. FIG. 8 is a block diagram of an image pickup apparatus 800 in this embodiment. The image pickup apparatus 800 includes an image processor 804 (image processing apparatus) that is capable of performing the image processing method in each embodiment described above.

In the image pickup apparatus 800, an object (not illustrated) is imaged on an image pickup element 802 via an image pickup optical system 801 (optical system) including an aperture stop 801a (or light shielding member) and a focus lens 801b. In this embodiment, the image pickup optical system 801 is an interchangeable lens (lens apparatus) removably mounted on an image pickup apparatus body including the image pickup element 802. However, this embodiment is not limited thereto, and can be applied also to an image pickup apparatus including an image pickup apparatus body and an image pickup optical system 801 integrated with each other.

An aperture value (F number) is determined by the aperture stop 801a or the light shielding member. The image pickup element 802 photoelectrically converts an object image (optical image) formed via the image pickup optical system 801 to output an image signal (captured image data). An electric signal output from the image pickup element 802 is output to an A/D converter 803. The A/D converter 803 converts the electric signal (analog signal) input from the image pickup element 802 to a digital signal (captured image) and then outputs the digital signal to the image processor 804. The image pickup element 802 and the A/D converter 803 constitute an image pickup unit that photoelectrically converts the optical image (object image) formed via the image pickup optical system 801 to output the captured image.

The image processor 804 performs predetermined image processing on the digital signal output from the A/D converter 803, i.e., image generated based on the image signal output from the image pickup element 802, by using each of pieces of information of a state detector 807 and a memory 808. Especially, the image processor 804 of this embodiment performs the moire correction processing on the captured image to output a corrected image (moire corrected image). The image processor 804 includes an acquisition unit 804a (acquirer or acquisition circuit), an estimation unit 804b (estimator or estimation circuit), a determination unit 804c (determiner or determination circuit), and a correction unit 804d (corrector or correction circuit). The acquisition unit 804a acquires the captured image, the image capturing condition information, and the optical characteristic information. The estimation unit 804b estimates a moire component (moire generation amount) included in the captured image. The determination unit 804c determines the correction amount based on the estimated moire component. The correction unit 804c corrects the captured image so as to reduce the moire component included in the captured image based on the determined correction amount (i.e., performs the moire correction processing).

The memory 808 (memory unit or memory circuit) stores an optical transfer function (optical transfer function data) of the image pickup optical system 801 for each image capturing condition (image capturing condition information), i.e., for each of combinations of a focal length at the time of photography, an F number, a photographing distance, and an image height. The memory 808 has the same function as the optical transfer function memory 603 illustrated in FIG. 6. The image capturing condition is for example acquired by the image pickup optical controller 806 or the state detector 807. In this embodiment, the image processor 804 and the memory 808 constitute the image processing apparatus. In this embodiment, the function of the optical transfer function memory can be included in the image processor 804, instead of the memory 808 provided outside the image processor 804.

The image processor 804 estimates the moire generation amount based on the optical transfer function, determines the correction amount based on the estimated moire generation amount, and performs the moire correction processing based on the determined correction amount. Furthermore, the image processor 804 is capable of performing various settings (settings of parameters) for example to perform the moire correction processing only in a predetermined region (predetermined target region) in the image. It is preferred that these parameters can be changed while a user confirms the image on the display apparatus 702 after the restoration processing is performed.

The output image (moire corrected image) processed by the image processor 804 is recorded in an image recording medium 809 in a predetermined format. A display 805 displays an image obtained by performing predetermined processing for display on the processed image in this embodiment. Alternatively, the display 805 may display a simply-processed image for high-speed display. The display 805 also displays a GUI to select an image restoration mode or a normal image capturing mode by a user. When the image restoration mode is selected by the user via the GUI on the display 805, a system controller 810 controls the image processor 804 to perform the image processing method of Embodiment 1 or 2.

The system controller 810 includes a CPU, an MPU, or the like, and it controls a whole of the image pickup apparatus 800. More specifically, the system controller 810 controls each of the image processor 804, the display 805, an image pickup optical system controller 806, the state detector 807, and the image recording medium 809. The image pickup optical system controller 806 controls the motion of the image pickup optical system 801. The state detector 807 detects a state of the image pickup optical system 801 based on information of the image pickup optical system controller 806. In the image pickup apparatus 800, software (an image processing program) that achieves the image processing method described above can be supplied to the system controller 810 via a network or a storage medium, and then the system controller 810 can read out to execute the image processing program.

As described above, the image processing apparatus (for example, image processor 804) includes the estimator (estimation unit 804b (estimation circuit)), the determiner (determination unit 804c (determination circuit)), and the corrector (correction unit 804d (correction circuit)). The estimator estimates a moire component (moire generation amount) included in an image based on optical characteristic information. The determiner determines a correction amount based on the estimated moire component. The corrector corrects the image so as to reduce the moire component included in the image based on the correction amount.

Preferably, the corrector adjusts linearity of a color component of the image based on the correction amount. More preferably, the determiner determines, as the correction amount, an adjustment amount to adjust the linearity of the color component for each of a plurality of regions in the image. Then, the corrector adjusts the linearity of the color component for each of the plurality of regions based on the adjustment amount.

Preferably, the determiner determines the correction amount based on the optical characteristic information and a Nyquist frequency of an image pickup element. Preferably, the estimator estimates the moire component based on the optical characteristic information relating to the Nyquist frequency. Preferably, the estimator estimates the moire component based on the optical characteristic information relating to a predetermined frequency range with reference to the Nyquist frequency. Preferably, the optical characteristic information is information relating to an optical transfer function (OTF or MTF).

Preferably, the image processing apparatus includes an acquirer (acquisition unit 804a (acquisition circuit)) that acquires the image and image capturing condition information relating to the image. More preferably, the acquirer acquires the optical characteristic information based on the image and the image capturing condition information. More preferably, the acquirer acquires, as the optical characteristic information, a plurality of pieces of optical characteristic information depending on the plurality of regions in the image. Preferably, the determiner determines the correction amount based on each of the plurality of pieces of optical characteristic information depending on the plurality of regions in the image. Preferably, the acquirer acquires optical characteristic information corresponding to a region of the image specified by a user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to each embodiment, an image processing apparatus, an image pickup apparatus, an image processing method, an image processing program, and a storage medium which are capable of effectively correcting a moire component included in an image can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SINGS LIST

804 IMAGE PROCESSOR (IMAGE PROCESSING APPARATUS)
804b ESTIMATION UNIT (ESTIMATOR)
804c DETERMINATION UNIT (DETERMINER)
804d CORRECTION UNIT (CORRECTOR)

The invention claimed is:
1. An image processing apparatus comprising:
an estimator configured to estimate a moire component included in at least part of an image based on optical characteristic information;
a determiner configured to determine a correction amount based on the estimated moire component; and
a corrector configured to correct the image so as to reduce the moire component included in the at least part of the image based on the correction amount,
wherein the corrector is configured to adjust linearity of each pixel of the at least part of the image plotted in a color line matrix with three axes indicating three color components of the at least part of the image based on the correction amount.
2. The image processing apparatus according to claim 1, wherein the optical characteristic information is information relating to an optical transfer function.
3. The image processing apparatus according to claim 1, wherein:

the determiner is configured to determine, as the correction amount, an adjustment amount to adjust the linearity for each of a plurality of regions in the image, and
the corrector is configured to adjust the linearity for each of the plurality of regions based on the adjustment amount.
4. The image processing apparatus according to claim 1, wherein the determiner is configured to determine the correction amount based on the optical characteristic information and a Nyquist frequency of an image pickup element.
5. The image processing apparatus according to claim 1, wherein the estimator is configured to estimate the moire component based on the optical characteristic information relating to a Nyquist frequency.
6. The image processing apparatus according to claim 1, wherein the estimator is configured to estimate the moire component based on the optical characteristic information relating to a predetermined frequency range with reference to a Nyquist frequency.
7. The image processing apparatus according to claim 1, further comprising an acquirer configured to acquire the image and image capturing condition information relating to the image.
8. The image processing apparatus according to claim 7, wherein the acquirer is configured to acquire the optical characteristic information based on the image and the image capturing condition information.
9. The image processing apparatus according to claim 8, wherein the acquirer is configured to acquire optical characteristic information corresponding to a region of the image specified by a user.
10. The image processing apparatus according to claim 8, wherein the acquirer is configured to acquire, as the optical characteristic information, a plurality of pieces of optical characteristic information depending on a plurality of regions in the image.
11. The image processing apparatus according to claim 10, wherein the determiner is configured to determine the correction amount based on each of the plurality of pieces of optical characteristic information depending on the plurality of regions in the image.
12. A non-transitory computer-readable storage medium storing an image processing program which causes a computer to execute a process comprising:
acquiring an image and image capturing condition information relating to the image and acquire, as optical characteristic information, a plurality of pieces of optical characteristic information depending on a plurality of regions in the image based on the image and the image capturing condition information;
estimating a moire component included in each of the plurality of regions in the image based on each of the plurality of pieces of optical characteristic information;
determining a correction amount based on the estimated moire component; and
correcting the image so as to reduce the moire component included in each of the plurality of regions in the image based on the correction amount.
13. An image pickup apparatus comprising:
an image pickup element configured to photoelectrically convert an optical image formed via an image pickup optical system to output an image signal;
an estimator configured to estimate, based on optical characteristic information, a moire component included in at least part of an image generated from the image signal;

a determiner configured to determine a correction amount based on the estimated moire component; and a corrector configured to correct the image so as to reduce the moire component included in the at least part of the image based on the correction amount, wherein the corrector is configured to adjust linearity of each pixel of the at least part of the image plotted in a color line matrix with three axes indicating three color components of the at least part of the image based on the correction amount.

14. An image processing method comprising:

estimating a moire component included in at least part of an image based on optical characteristic information;

determining a correction amount based on the estimated moire component; and correcting the image so as to reduce the moire component included in the at least part of the image by adjusting linearity of each pixel of the at least part of the image plotted in a color line matrix with three axes indicating three color components of the at least part of the image based on the correction amount.

15. An image processing method comprising:

acquiring an image and image capturing condition information relating to the image and acquire, as optical characteristic information, a plurality of pieces of optical characteristic information depending on a plurality of regions in the image based on the image and the image capturing condition information;

estimating a moire component included in each of the plurality of regions in the image based on each of the plurality of pieces of optical characteristic information;

determining a correction amount based on the estimated moire component; and correcting the image so as to reduce the moire component included in each of the plurality of regions in the image based on the correction amount.

16. A non-transitory computer-readable storage medium storing an image processing program which causes a computer to execute a process comprising:

estimating a moire component included in at least part of an image based on optical characteristic information;

determining a correction amount based on the estimated moire component; and correcting the image so as to reduce the moire component included in the at least part of the image by adjusting linearity of each pixel of the at least part of the image plotted in a color line matrix with three axes indicating three color components of the at least part of the image based on the correction amount.

17. An image processing apparatus comprising:

an acquirer configured to acquire an image and image capturing condition information relating to the image and acquire, as optical characteristic information, a plurality of pieces of optical characteristic information depending on a plurality of regions in the image based on the image and the image capturing condition information;

an estimator configured to estimate a moire component included in each of the plurality of regions in the image based on each of the plurality of pieces of optical characteristic information;

a determiner configured to determine a correction amount based on the estimated moire component; and a corrector configured to correct the image so as to reduce the moire component included in each of the plurality of regions in the image based on the correction amount.

* * * * *